Patented Feb. 14, 1939

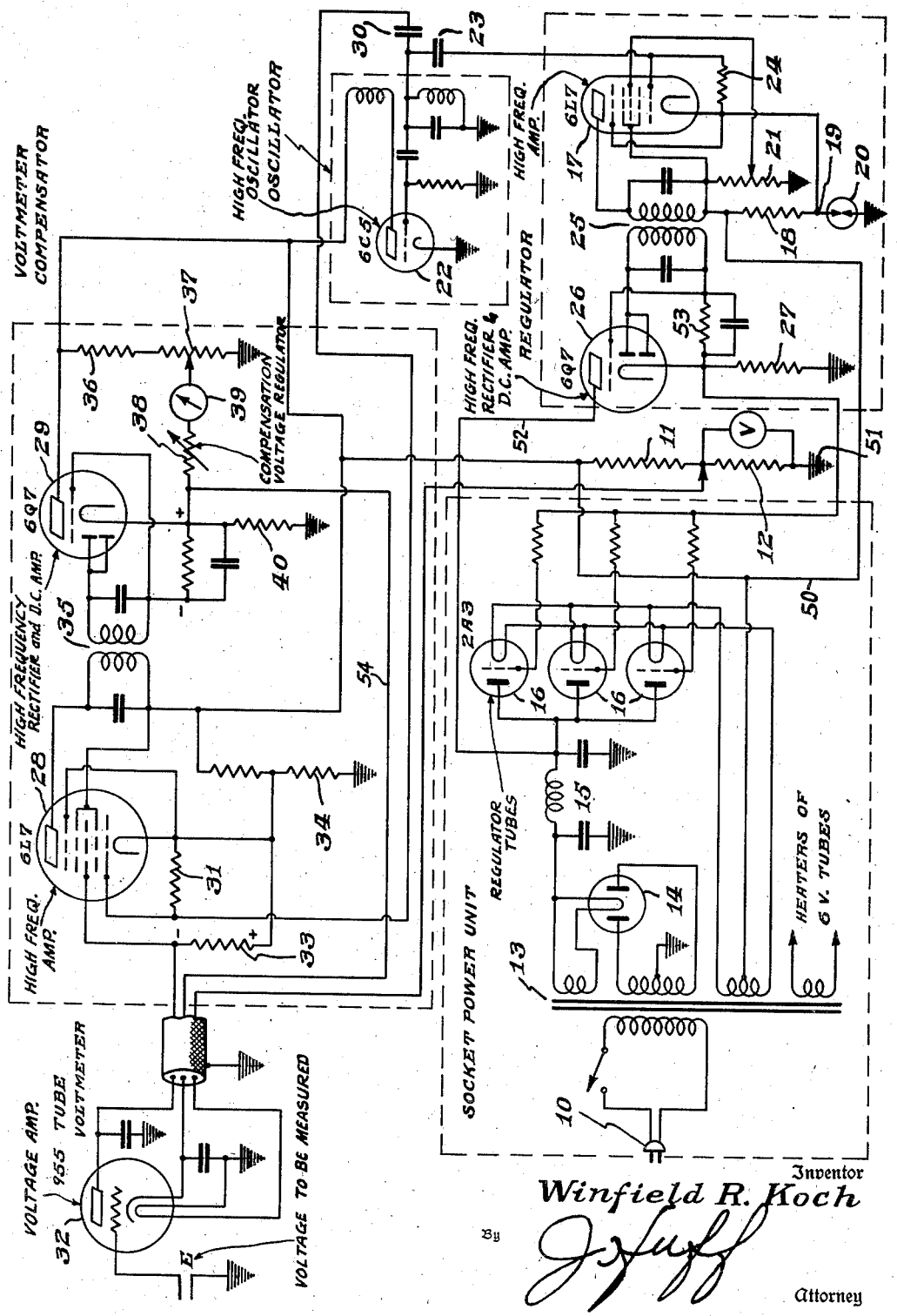

2,147,446

UNITED STATES PATENT OFFICE 2,147,446

MEASURING DEVICE

Winfield R. Koch, Merchantville, N. J., assignor to Radio Corporation of America, a corporation of Delaware Application June 22, 1937, Serial No. 149,618

7 Claims. (Cl. 171—95)

This invention relates to measuring devices, such as voltmeters, ammeters or the like, and has for its principal object the provision of an improved device which (1) may be energized from the usual alternating current supply circuit and (2) operates with a high degree of sensitivity and stability irrespective of variation in the electrical conditions of the supply circuit from which it derives its operating energy.

Further objects of the invention are to provide a comparatively inexpensive and highly sensitive meter, to provide a meter which is self-compensating and operates independently of variations in its operating energy, to provide an improved circuit for amplifying the electrical characteristics to be measured and to provide an improved means for regulating the level at which operating energy is delivered to the operating circuits.

As will hereinafter appear in greater detail, the improved device includes a socket power supply unit, means for regulating the voltage at which power is delivered from this unit and a compensated direct current amplifier for amplifying the voltage or other electrical characteristic to be measured. A further feature of the device is an oscillation generator which is energized and supplies impulses of intermediate or relatively high frequency for operation of the main amplifier and voltage regulator amplifier, both of which are of the direct current type.

The invention will be better understood from the following description when considered in connection with the single figure of the drawing, and its scope is indicated by the appended claims.

The single figure of the drawing is a wiring diagram of the improved measuring device.

This device includes a plug 10 which is connected to resistors 11 and 12 through a transformer 13, a rectifier 14, a filter 15 and regulator tubes 16. Assuming the plug 10 to be connected to an alternating current supply source, it will be apparent that filtered rectified or direct current will be supplied to the resistors 11—12 and that variation in the voltage of the supply source will produce corresponding and undesired variations in the rectified current and in the potential drop of the resistors 11—12. For the purpose of minimizing such undesired variations, a regulating potential is applied to the control grids of the tubes 16.

This grid control potential is produced by a regulator unit including an amplifier 17 which (1) derives its plate current from a resistor 18 connected through a lead 50 and a ground connection 51 in parallel with resistors 11—12 to a constant voltage point 19 formed by the regulator tube 20, (2) derives its grid control potential from a similarly connected resistor 21 connected in parallel with the resistors 11—12, (3) derives a high frequency carrier current from an oscillator 22 through a capacitor 23 and a resistor 24, and (4) has its output circuit coupled through a tuned transformer 25 to a detector and amplifier tube 26. This detector-amplifier tube 26 is supplied with plate current from the output terminals of the filter 15 through a lead 52 and operates through the potential drop of a resistor 27 to regulate the grid control potentials of the tubes 16 which function to prevent variation in the potential drop of resistors 11—12.

The operation of the regulator unit to maintain substantially constant voltage at the terminals of the resistors 11—12 will be readily understood without detailed explanation. Thus, assuming an increase in the rectified output voltage applied to resistors 11—12, the resistor 21 operates to render the control grid of amplifier 17 less negative, thus increasing the high frequency amplification of this amplifier, the diode of the detector-amplifier 26 takes more current due to this increased amplification, the grid potential of the triode of the detector-amplifier 26 becomes more negative due to the increased potential drop of the resistor 53, the potential drop of the resistor 27 decreases due to decreased plate current of the detector 26, the grid potentials of the tubes 16 become more negative due to the decreased potential of the register 27 and the voltage at the upper terminal of resistors 11—12 is reduced due to the increased plate impedance of the regulator tubes 16.

From the regulated voltage resistors 11—12, plate potential is applied to the oscillation generator 22, to the amplifier 28 and detector-amplifier 29 of the compensated measuring unit, and to the cathode heater of an input tube 32 which supplies control potential to the voltmeter compensator. High frequency current is supplied from the generator 22 through a capacitor 30 and a resistor 31 to the first or inner control grid of the amplifier 28. As in the case of the regulator amplifier 17, this type of connection has the advantage that the direct current amplifier may be inductively coupled to the stage into which it feeds.

The measuring unit includes the input tube 32 which has the measured voltage E applied to its input circuit and is coupled through resistors 33 and 34 to the outer control grid of the amplifier 28. Interposed between the amplifier 28 and the detector-amplifier 29 is a tuned coupling transformer 35. The amplifier output circuit of the device 29 includes a resistor 40. Between the cathode of the device 29 and the adjustable terminal of the resistor 37 is connected a variable resistor 38 and a meter 39 which indicates or measures the voltage E. Resistors 36 and 37 provide an adjustable voltage supply for permitting a zero adjustment of the meter 39. From the left hand end of the resistor 38, potential is applied to the cathode of the input tube 32 for the purpose of compensating for the effect of the voltage being measured. The sensitivity of the voltmeter can be adjusted by changing the resistance of resistor 38.

The operation of the measuring unit will be readily understood. Thus, when voltage is applied to the grid of the input device 32, increased plate current flows through resistors 33, 34 and 40. The control grid of the device 28 is made more negative and the plate current of this device is correspondingly reduced. This results in a decrease of the detector current of the device 29 which operates to make the grid of this device less negative and to increase the plate current of the triode portion of the device 29 and vary the potential applied to the resistor 38 and the meter 39. This variation in potential is applied to the cathode of the device 32, thus increasing its bias to compensate for the effect of the measured voltage.

The plate current of the device 32 will be very small under all conditions, making the grid impedance of this device, which is influenced by the number and transit-time of the electrons emitted by the cathode, large at high as well as low frequencies. Because the plate current peak of this device is always low, the cathode heater of this tube may be operated at 4 volts or less instead of the rated 6.3 volts, thus resulting in long life and stability, as well as an increase in grid impedance. The increase in cathode voltage also operates the indicating meter 39 which may require 100 microamperes, while the plate circuit of the tube 32 is about 1 microampere. Because the gain in the direct current amplifier is large, the compensation is very nearly 100% so that the increase in cathode voltage will be very nearly equal to the applied peak voltage. Since the tube 32 is normally biased to very nearly the cut-off point, when a voltage is applied the bias is automatically increased due to the voltage applied through a lead 54 to the cathode of the input tube 32 so that the plate current is kept small. This has the advantage of giving very little damping to the circuits to which the voltmeter is connected.

Thus the invention has been described as a voltage measuring device. The voltages to be measured E are applied to a voltage amplifier 32. The changes in the plate current of the voltage amplifier 32 are applied to regulate the gain of the high frequency amplifier 28. The high frequency currents are applied to the first grid of amplifier 28 by a connection, including the condenser 30, to the high frequency oscillator 22. The amplified high frequency currents are rectified by the diode section of the thermionic tube 29. The rectified high frequency voltages are applied to the triode section of tube 29. The triode section of the tube 29 is connected as a d. c. amplifier. The amplified d. c. voltages are applied through resistors 36, 37 and 38, meter 39 and connection 54 to the cathode of the voltage amplifier 32. The amplified voltages thus fed back to the cathode are adjusted so that the feedback voltages are substantialy of the same amplitude as the peak values of the voltage to be measured. The amplitude of the feedback voltages is indicated by the meter 39. In brief, the operation of the device corresponds to what might be termed the "automatic adjustment" of a "slide back" vacuum tube voltmeter, which is well known to those skilled in the art.

Since the voltage amplifier 32, the high frequency amplifier 28, the high frequency rectifier and d. c. amplifier 29, and the high frequency oscillator 22 are energized from a socket power source some regulation is desired to prevent fluctuations in the operating parameters of the thermionic tubes. The regulation is obtained by applying the high frequency currents from the oscillator 22 to a high frequency amplifier tube 17, whose gain is dependent upon the voltage of the rectified currents 11, 12. The thus regulated high frequency currents are applied to the diode section of the thermionic tube 26. The diode section rectifies the high frequency currents which are applied to the triode section of the tube 26. The triode section of the tube 26 is operated as a d. c. amplifier. The amplified d. c. voltages appear across the cathode resistor 27 of the tube 26. These d. c. voltages in the cathode resistor 27 are applied by the lead 50 to the grids of the regulator tubes 16 to regulate their output impedance. The output circuits of the regulator tubes are in series with the rectified power supply and are so arranged that increases in amplitude of the voltages at the source 10 are accompanied by increases in the impedances of the regulator tubes, whereby the rectified power supply voltage amplitude is maintained substantially constant.

I claim as my invention:

1. An electrical measuring instrument including a power supply unit, means including an amplifier-detector channel responsive to the output voltage of said unit for regulating said voltage, an electron discharge device provided with an input circuit adapted to receive the electrical quantity to be measured and with an output circuit, an amplifier-detector channel connected to said output circuit and responsive to said quantity, means connecting said amplifier detector channel to said input circuit for applying thereto voltages balancing said electrical quantity, and an oscillation generator energized by said power supply unit and arranged to supply carrier current to said amplifier-detector channels.

2. An electrical measuring instrument including a power supply unit, an oscillation generator energized by said power supply unit, means coupled with said generator for regulating the voltage of said unit, an electron discharge device provided with an input circuit adapted to receive the electrical quantity to be measured and with an output circuit, an amplifier coupled to said output circuit and to said generator, means for detecting the output of said amplifier, means for indicating said detected output and means for applying said detected output to said electron discharge input circuit for balancing said electrical quantity.

3. An electrical measuring instrument including a power supply unit, an oscillation generator energized by said power supply unit, means coupled with said generator for regulating the voltage of said unit, an electron discharge device provided with an input circuit adapted to receive the electrical quantity to be measured and with an output circuit, an amplifier coupled to said output circuit and to said generator, means for detecting the output of said amplifier, means for indicating said detected output, means for producing a zero adjustment of said indicating means, and connections for applying said detected output to the input circuit of said electron discharge device whereby said detected output compensates for said electrical quantity.

4. An electrical measuring instrument including a power supply unit, an oscillation generator energized by said power supply unit, means coupled with said generator for regulating the voltage of said unit, an electron discharge device provided with an input circuit adapted to receive the electrical quantity to be measured and with an output circuit, an amplifier coupled to said output circuit and to said generator, means for detecting the output of said amplifier, means for applying said detected output to compensate for the application of said electrical quantity, means for indicating said detected output, and means for adjusting the sensitivity of said indicating means.

5. An electrical measuring instrument including a power supply unit, an oscillation generator energized by said power supply unit, means coupled with said generator for regulating the voltage of said power supply, an electron discharge device provided with an input circuit adapted to receive the electrical quantity to be measured and with an output circuit, an amplifier coupled to said output circuit and to said generator, means for detecting the output of said amplifier, means for indicating said detected output, and means for applying to said input circuit a bias voltage dependent on said detected output.

6. An electrical measuring device including a source of power, a high frequency oscillator, connections from said generator to said source for energizing said generator, a voltage amplifier including input connections for receiving the electrical quantity to be measured and an output circuit, a high frequency amplifier having an input and an output, means connecting said output circuit to the input of said amplifier, means connecting the input of said amplifier to said generator, a detector connected to said amplifier output, a d. c. amplifier connected to said rectifier, means for applying compensating voltages derived from said d. c. amplifier to said voltage amplifier whereby the effect of said electrical quantity is substantially balanced, means for indicating the amplitude of said compensating balancing voltages, and means connected to said generator and said source of power for regulating said power source whereby the amplitude of the voltage of said source is maintained substantially constant.

7. A device of the character of claim 6 in which said last mentioned means includes a high frequency amplifier, a high frequency rectifier, a d. c. amplifier, regulator tubes, and means for applying the amplified d. c. currents to said regulator tubes.

WINFIELD R. KOCH.